United States Patent Office 3,441,205
Patented Apr. 29, 1969

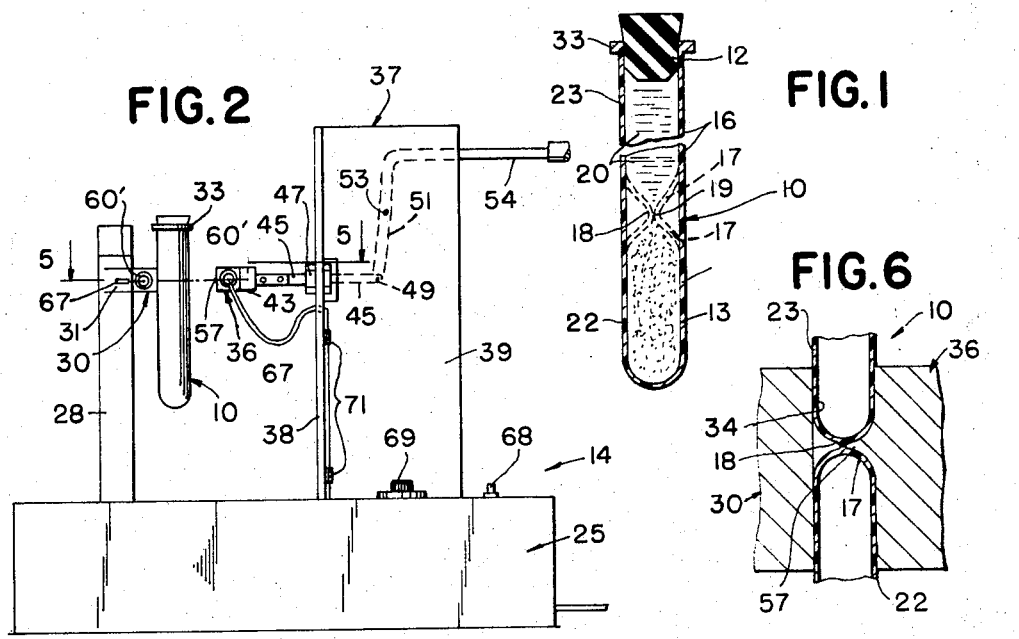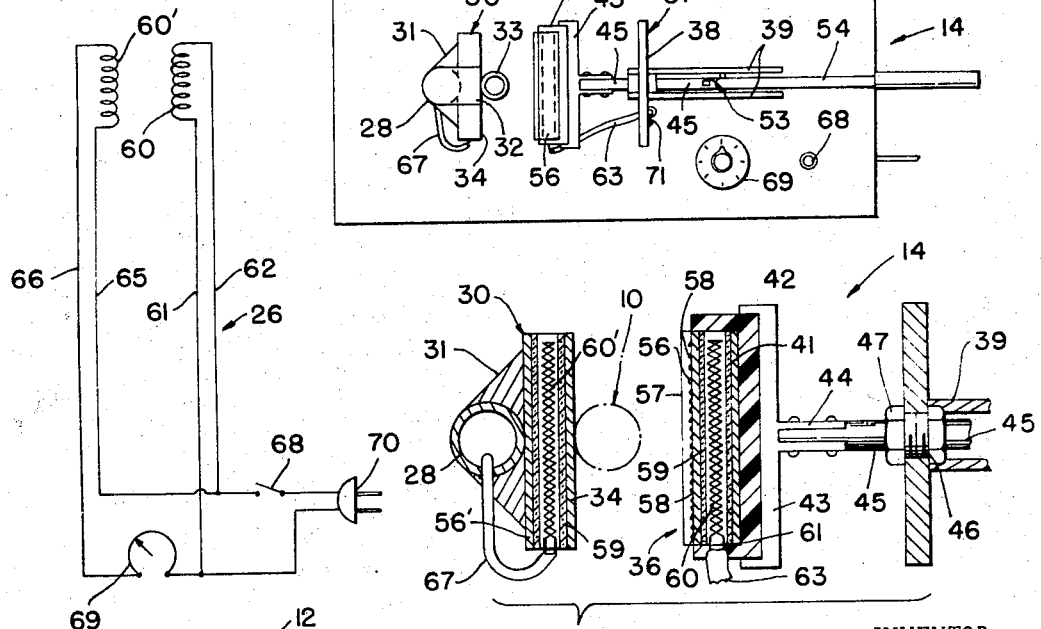

3,441,205
METHOD FOR SEPARATING SEDIMENT FROM SUPERNATANT FLUID
Marvin Kendall Young, Jr., 4011 Rockledge, Austin, Tex. 78731
Filed Oct. 10, 1966, Ser. No. 585,413
Int. Cl. B04b 5/00
U.S. Cl. 233—26     6 Claims

ABSTRACT OF THE DISCLOSURE

The method is shown and described for the separation of blood and like solids-including liquids into sediment and supernatant fluid, in which a liquid specimen is placed in an open-ended, heat-sealable cylindrical container, then centrifuged to accomplish the separation. The tube is then simultaneously separated as to its supernatant fluid and sediment components while simultaneously heat sealing the two components along a line at the zone of separation.

---

The present invention relates to an improved apparatus and a method for separating sedimentary material, such as red blood corpuscles, from the supernatant liquid plasma thereof; and the invention also affords an improved supernatant-containing, tubular package as the product of the method and apparatus. More particularly, the method is preferably one in which the corpuscular solids are separated from the plasma by centrifugation.

Heretofore, such centrifuging, as performed extensively in clinical or chemical laboratories throughout the world, has involved the use of a glass tube in which the blood sample is centrifuged, followed by the transfer of supernatant liquid to a plastic tube for analysis, for example in a conventional automated analyzer. The transfer involves the use of still a third piece of equipment, usually a glass pipette. The procedure is thus time consuming and of significant cost, due to the use of triple centrifuging and transfer means.

It is, therefore, an object of the invention to provide an improved method and apparatus for separating blood or analogous liquid into sediment or centrifugate and supernatant components, using but a single flexibly deformable, and preferably transparent, specimen tube for both an initial stratification of these components, centrifugally or otherwise, followed by the physical separation thereof from one another in two sealed container portions. The last named operation involves a simultaneous sealing and mechanical severance of the original tube along a desired zone of separation of at least a portion of the supernatant from at least a portion of the centrifugate.

In accordance with the invention, the tube is of a heat- or pressure-sealable plastic material; and during the sealing and severing manipulation referred to an upper, full diameter end of the tube containing the stratified components is closed by a removable stopper. Accordingly, following sealing and separating, the upper supernatant filled tube portion may be transferred as a package for analysis, and the sealed centrifugate-containing portion may be discarded, or put to other desired use.

While the sealing and physical separation of the tube components may be performed by the very simplest sort of hand tools, the invention also provides apparatus for the purpose which is also simple in character, and makes possible a very quick, efficient and easy production of the desired heat seal, accompanied by a substantially or fully complete severance of the tube.

More specifically, the apparatus of the invention comprises a suitable base provided with relatively fixed and movable sealing heads at an appropriate elevation above the base. One of these, i.e., the fixed one, is supported on an upright which also has means for suspending a specimen-containing tube of the centrifuged liquid directly adjacent the head. The other head is mounted over the base by means of another upright and has simple operating means for projecting it bodily toward the tube and the fixed sealing head for heat sealing the tube thereagainst, and at the same time severing the tube.

By preference, the movable sealing and severing head is provided with a rectilinear projecting knife edge which comes into contact with and diametrically collapses or squeezes the tube at the desired sealing and severing zone, which will normally, but not necessarily always, correspond with the zone of stratification of the supernatant and the centrifugate. Under an application of appropriate pressure the tube is sealed and severed at the zone in question, whereupon the supernatant containing package portion of the tube may be bodily transferred to analytical equipment.

The foregoing as well as other objects will become more apparent as this description proceeds, especially when considered in connection with the acompanying drawings illustrating the invention, wherein:

FIG. 1 is a view, partially broken away, in longitudinal axial section through a flexible specimen-containing tube, indicating the stratified relationship of its supernatant and centrifugate contents, this view also indicating in dotted line the manner in which the tube is diametrically squeezed in the sealing and severing operation;

FIG. 2 is a side elevational view of apparatus in accordance with the invention for performing the tube sealing and severing operation;

FIG. 3 is a top plan view of the equipment of FIG. 2;

FIG. 4 is a simple schematic wiring diagram for the heat sealing and severing components of the apparatus;

FIG. 5 is an enlarged scale view in horizontal section along broken line 5—5 FIG. 2;

FIG. 6 is a fragmentary view in vertical and contral section through the sealing and severing heads of the equipment, indicating the knife-edge nature of one thereof, and the manner in which it acts on the tube in sealing and severing the latter; and FIG. 7 is a fragmentary view in cross section in a vertical plane through the axis of a sealed and severed, supernatant-containing tube component, as the latter is supported on the sample rack of a conventional piece of analyzer equipment.

The operation by which the improved supernatent-containing package of the invention is produced is illustrated in FIG. 1. As shown therein, an elongated tube 10 of flexibly deformable, transparent and heat-sealable or pressure-sealable plastic material, is tightly but removably closed at its upper open, full diameter end by a rubber stopper 12. Its material should be sufficiently stiff to withstand evacuation, and it is charged from the needle of the physician or technician with a suitable quantity of the blood or other sediment-containing liquid which is to be analyzed as to its supernatant. The sediment is then separated volume-wise or stratified by centrifuging, with a resultant collection of the red corpuscular matter of solids at the base of tube 10, as indicated by the reference numeral 13 in FIG. 1.

The centrifuged tube 10 is then transferred to the severing and sealing equipment or apparatus of the invention, generally designated in FIGS. 2, 3 and 4 by the reference numeral 14, in which it is manipulated in a manner to be described. The result is that the wall 16 of tube 10 is diametrically collapsed or squeezed into the convex wall curvatures 17 appearing in dotted line in FIG. 1. The thus-deformed wall portions are heat- or pressure-sealed to the opposite wall along a rectilinear transverse zone 18, and tube 10 is concurrently severed, as indicated by the reference numeral 19.

The location of the sealed zone 18, which is narrow and of minimal extent in reference to the length of the tube, will generally be at the interface or line of stratification between the entirety of the corpuscular or other sedimentary centrifugate 13 and the entirety of the supernatant 20, as appears in FIG. 1. However, this is a matter of choice on the part of the operator, it being only contemplated that the bottom severed tube portion 22 shall contain at least a part of the centrifugate 13, and that the upper severed tube portion 23 shall contain at least a part of the plasma or other supernatant 20.

This completes the volumetric separating of the centrifuged stock and the individual sealing and separating of the separated liquid components in package form. The supernatant-containing tube portion 23 may be transferred immediately to automated analyzing equipment, or employed for analysis in any other way or for any other purpose. The tube portion 22 containing solids 13 may be disposed of or employed further as desired.

Now referring to FIGS. 2–5 of the drawings, the apparatus 14 is shown as comprising a hollow, box-like rectangular base 25, in which electrical heating and control circuitry, generally designated 26 (FIG. 4), is disposed. An upright tubular support 28 is fixedly mounted on and projects above the top of base 25; and this upright has a first heat sealing head 30 fixedly mounted thereon adjacent the top thereof. Head 30 is elongated in shape and rectangular in cross-section, being disposed in right angular intersecting relationship with upright 28 at its horizontal midpoint. Internal details of the fixedly mounted head 30 will be hereinafter described.

By preference, the tubular support or upright 28 has a laterally flanged top bracket 31 affixed thereon; to which bracket the head 30 is suitably secured for its support. Although additional means may be provided for the support of tube 10 at a top enlarged bead 33 of the latter, it may well be preferred to sustain the tube manually in preparation for the sealing and severing operation. Bead 33 affords a means of support for the sealed and severed tube when placed in a rack, such as the apertured sample plate of a conventional auto-analyzer. As appears in FIGS. 2, 3 and 5, the sealing surface 34 of the heat sealing head 30 is rectilinear and flat.

An opposite sealing and severing head, generally designated 36, faces fixed head 30, and is mounted for movement to and from the latter in the sealing and severing operation on a second upright support 37 fixedly mounted atop the base 25. Support 37 includes an inner rectangular face plate 38 and a pair of transversely spaced parallel plates 39 extending rearwardly of plate 38, being fixedly secured to the latter, as by welding. Head 36 is sustained by support 37 in transversely facing register with the fixedly mounted head 30, and its internal heating structure is identical with that of fixed head 30, as will be described.

As appears best in FIGS. 3 and 5, the head 36 is nestingly received snugly in a recess 41 of a heat insulating block 42 of Teflon or the like, and it may be anchored therein by suitable means (not shown) if such further mounting provision is deemed necessary. The insulating block 42 is in turn nestingly received within a correspondingly contoured recess of a rigid metal body member 43; and this member has a rearwardly projecting forked or clevis-like formation 44 which receives a flattened tang portion of an actuating rod 45, with screws securing the tang rigidly to formation 40.

Actuating rod 45 is slidably guided in the horizontal bore of a tubular nipple or sleeve 46 (FIG. 5), this sleeve being snugly received in a hole in the upright plate 38, and tightly held therein by nuts 47 taken up on the threaded exterior of the sleeve. Nipple 46 is preferably provided with an internal nylon anti-friction bushing.

As depicted in FIGS. 1 and 3, rod 46 extends rearwardly between the parallel plates 39 of support structure 37, and at its rear end has a pivotal connection at 49 to one end of an operating arm or lever 51. This is preferably a pin and slot connection which will enable a rectilinear sliding action of actuator rod 45 under force applied in either direction by lever 51; and the latter is pivotally mounted between plates 39, as by a medial pin 53. Lever 51 has a 90° offset handle extension 54 at which it is manually operated by an attendant.

It is seen, referring to FIG. 2, that a clockwise swing of lever 51 will produce rectilinear sliding motion of sealing and severing head 36 to the left into engagement with the centrifuged tube 10. A reverse movement disengages head 36 from an extended position in which it has elastically deformed, severed and sealed the tube 10 against fixed sealing head 30, returning head 36 to the withdrawn position appearing in FIGS. 2, 3 and 5.

As shown best in FIGS. 2, 5 and 6, the sealing and severing head 36 comprises an elongated tubular body member 56 of highly heat conductive metal, being of rectangular cross section to fit within the recess 41 of its insulating mount 42. Member 56 has an integral, forwardly projecting and elongated knife-edge 57 which is co-extensive in length therewith. As appears in FIG. 5, the heads 30 and 36 are also co-extensive in length. In order to improve the heat seal, the body 56 of head 36 may be provided with score formations 58 at either side of its knife edge, as shown in FIG. 5.

Body 56 has cylindrical bore therethrough which snugly receives a tubular glass sheath 59; and a heating coil 60, as a Nichrome wire, is disposed within the sheath 59. Lead wires 61, 62 (FIG. 4) are electrically connected to the ends of resistance heater coil 60, being brought thereto through the usual insulating sheath 63; and the latter is fixedly connected to insulator member 42 at a side thereo, as shown in FIG. 5.

The heating structure of the fixed sealing head 30 is identical to that of the movable head 36; accordingly, corresponding reference numerals, primed, are employed to designate corresponding parts, and further description is dispensed with.

Referring to FIG. 4, the resistance coil 60' of fixed sealing head 30 is electrically supplied through leads 65 and 66 connected to its terminals, the leads being brought out through the usual insulating sheath 67, which passes downwardly through the tubular upright support 28 of the apparatus. Leads 61, 62 and 65, 66 are connected in parallel in the circuit 26 of FIG. 4, which also includes an "off-on" switch 68, a control rheostat 69 and an electrical connector plug 70. These components are housed within the base 25 of apparatus 14. The conductor sheath 63 and its leads 61, 62 to the movably head 36 are brought downwardly into the base at the rear of upright support plate 38 to which they are fixedly secured by clips 71 (FIG. 2), or otherwise.

It is seen that the invention affords an improved package comprised of a severed and sealed container tube portion which is tightly but removably stoppered at an end thereof and is partially or wholly filled with blood plasma or other supernatant fluid. FIG. 7 shows the supernatant-containing, sealed and severed tube portion or component 23, as supported at its top bead 33 in an aperture of the annular, disc-like rack 73 of a conventional autoanalyzer.

The invention also affords an improved method by which this container unit or package may be inexpensively produced, as compared with earlier procedures involving the use of separate centrifuging and transfer tubes, along with pipette or other transfer means; and the invention further provides a very simple, compact and inexpensively produced type of apparatus for performing its method. It is evident that tubes in a variety of shapes or designs may be expeditiously handled, and it is believed that the improvements of the invention will be extensively adopted in replacement of the equipment and procedures previously employed more expensively for the same purpose.

What is claimed is:

1. A method for physically separating a liquid into a sediment or the like and a supernatant fluid, comprising the steps of placing a liquid specimen in an open-ended tube of heat or pressure-sealable material, effecting a centrifugal stratification within the tube of supernatant from sediment, and applying sealing pressure to the tube to flexibly compress the latter in a zone transverse of the width and minimal of the length thereof at which it is desired to physically separate at least a part of the supernatant from at least a part of the sediment, as thus stratified, said application of pressure being carried out to an extent sufficient to effect a seal of the tube across said transverse zone, as well as a substantial severance from one another of portions of the tube containing the supernatant and sediment parts.

2. The method of claim 1, in which the severance of the tube is complete and substantially knife-like at said zone.

3. The method of claim 1, in which the severance of the tube is complete and substantially knife-like at said zone, the ends of said severed tube portions adjacent said zone being sealed across the width thereof along parallel rectilinear edges.

4. A method for physically separating a liquid into sediment or the like and a supernatant fluid, comprising the steps of placing a liquid specimen in an open-ended flexibly deformable tube or heat or pressure-sealable plastic material, effecting a centrifugal stratification within the tube of supernatant from centrifugate, and applying sealing pressure to the tube to flexibly compress the latter in a narrow zone transverse of the width and minimal of the length thereof at which it is desired to physically separate at least a part of the supernatant from at least a part of the centrifugate, as thus stratified, said application of pressure being carried out to an extent sufficient to effect a substantial severance from one another of portions of the tube containing the supernatant and centrifugate.

5. The method of claim 4, in which the severance of the tube is complete and substantially knife-like at said zone.

6. The method of claim 4, in which the severance of the tube is complete and substantially knife-like at said zone, the ends of said severed tube portions adjacent said zone being heat sealed across the width thereof along parallel rectilinear fused edges.

References Cited

UNITED STATES PATENTS

| | | | |
|---|---|---|---|
| 3,185,154 | 5/1965 | Caccavo et al. | |
| 2,600,216 | 6/1952 | Denison | 206—47 XR |
| 2,722,257 | 11/1953 | Lockhart | 150—.5 |
| 3,096,283 | 7/1963 | Hein | 233—26 XR |
| 3,254,828 | 6/1966 | Lerner | 229—69 XR |
| 3,326,458 | 6/1967 | Meryman et al. | 233—26 XR |

OTHER REFERENCES 1,014,348, August 1957, German printed application.

HENRY T. KLINKSICK, *Primary Examiner.*